United States Patent
Chen et al.

(10) Patent No.: US 9,830,953 B1
(45) Date of Patent: Nov. 28, 2017

(54) ELECTRONIC MODULE EJECTING MECHANISM AND PORTABLE ELECTRONIC DEVICE THEREOF

(71) Applicant: Wistron Corporation, New Taipei (TW)

(72) Inventors: Jhih-Ming Chen, New Taipei (TW); Meng-Chian Shiu, New Taipei (TW); Chi-Jen Lo, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/498,451

(22) Filed: Apr. 26, 2017

(30) Foreign Application Priority Data

Jan. 5, 2017 (TW) .............................. 106100258 A

(51) Int. Cl.
| | |
|---|---|
| *G11B 33/02* | (2006.01) |
| *G11B 33/14* | (2006.01) |
| *G06F 1/16* | (2006.01) |
| *G11B 17/04* | (2006.01) |
| *G11B 17/056* | (2006.01) |

(52) U.S. Cl.
CPC ........ *G11B 33/1453* (2013.01); *G06F 1/1656* (2013.01); *G11B 17/0405* (2013.01); *G11B 17/056* (2013.01)

(58) Field of Classification Search
None
See application file for complete search history.

(56) References Cited

U.S. PATENT DOCUMENTS

| 4,851,938 A | * | 7/1989 | Inami | G11B 15/67549 |
| | | | | 360/69 |
| 5,065,004 A | * | 11/1991 | Mizuno | G06K 7/0013 |
| | | | | 235/479 |
| 7,363,634 B2 | * | 4/2008 | Lin | G11B 17/056 |
| | | | | 720/609 |
| 2004/0169997 A1 | * | 9/2004 | Voon | G06F 1/181 |
| | | | | 361/679.31 |
| 2007/0029340 A1 | * | 2/2007 | Nagelski | A47F 1/10 |
| | | | | 221/268 |
| 2016/0334838 A1 | * | 11/2016 | Cheng | G06F 1/182 |

FOREIGN PATENT DOCUMENTS

KR 20040105202 A * 12/2004

* cited by examiner

*Primary Examiner* — Will J Klimowicz
(74) *Attorney, Agent, or Firm* — Winston Hsu

(57) ABSTRACT

An electronic module ejecting mechanism includes a frame, a door pivoted to the frame, a rod, a sliding sheet slidably disposed on the door, a swing sheet, and a button connected to the sliding sheet. An electronic module is inserted into an opening of the frame. The rod is slidably disposed in the frame and has groove and bending ends. The swing sheet is pivoted to the sliding sheet and has a latch end for inserting into the groove end when the sliding sheet slides to a lock position. When the latch end is inserted into the groove end and the swing sheet swings to an expanding position with opening of the door, the latch end pulls the groove end to make the bending end push the electronic module to partially protrude from the opening. When the door continues opening outwardly, the latch end is separate from the groove end.

15 Claims, 16 Drawing Sheets

ELECTRONIC MODULE EJECTING MECHANISM AND PORTABLE ELECTRONIC DEVICE THEREOF

BACKGROUND OF THE INVENTION

1. Field of the Invention

The present invention relates to an electronic module ejecting mechanism and a portable electronic device thereof, and more specifically, to an electronic module ejecting mechanism for pulling out an electronic module with opening of a door and a portable electronic device thereof.

2. Description of the Prior Art

In general, there is usually an electronic module (e.g. optical disk drive, hard disk drive, etc.) detachably disposed on a portable electronic device for a user to perform data access and update of the portable electronic device by hot plugging the electronic module. The conventional configuration is to detachably insert the electronic module into an extraction opening of a frame fixed to a containing opening of the portable electronic device so as to make the electronic module detachable for subsequent maintenance or replacement of the electronic module. In this design, for further providing a waterproof and dustproof function, an openable door is additionally disposed on the extraction opening of the frame. In such a manner, the portable electronic device can utilize the door to cover the containing opening of the portable electronic device and the extraction opening of the frame for generating the waterproof and dustproof effect.

In the aforesaid design, when the user wants to extract the electronic module from the extraction opening, the user just needs to open the door first, and then performs an electronic module ejecting operation (e.g. pressing an ejecting button on the portable electronic device) to eject the electronic module out of the extraction opening partially, so that the user can extract the electronic module out of the extraction opening smoothly. However, the aforesaid two-stage operation would result in a complicated electronic module ejecting process, so as to cause the user much inconvenience in extracting the electronic module out of the portable electronic device.

SUMMARY OF THE INVENTION

The present invention provides an electronic module ejecting mechanism for ejecting an electronic module. The electronic module ejecting mechanism includes a frame, a door, a rod, a sliding sheet, a button, and a swing sheet. The frame has an extraction opening. The electronic module is detachably inserted into the frame via the extraction opening. The door has a transverse slot formed thereon. The door is openably pivoted to a front side of the frame for covering the extraction opening. The rod is slidably disposed in the frame. The rod has a groove end and a bending end. A back side of the electronic module abuts against the bending end when the electronic module is inserted into the frame. The sliding sheet is slidably disposed on a back side of the door facing the extraction opening. The button is slidably disposed on a front side of the door and connected to the sliding sheet through the transverse slot, for driving the sliding sheet to slide between a release position and a lock position along the transverse slot on the door. The swing sheet has a pivot end and a latch end. The pivot end is pivoted to the sliding sheet to make the swing sheet swingable between an attaching position and an expanding position relative to the sliding sheet. The latch end is separate from the groove end when the sliding sheet slides to the release position. The latch end is inserted into the groove end when the sliding sheet slides to the lock position. When the button drives the sliding sheet to slide to the lock position and the swing sheet swings to the expanding position with outward opening of the door relative to the frame, the latch end pulls the groove end to make the rod slide forward, so as to push the electronic module via the bending end to protrude from the extraction opening partially. When the door continues opening outwardly relative to the frame, the latch end is separate from the groove end with outward opening of the door.

The present invention further provides a portable electronic device. The portable electronic device includes an electronic module, a device body, and an electronic module ejecting mechanism. The device body has a containing opening to contain the electronic module for performing data transmission between the device body and the electronic module. The electronic module ejecting mechanism is disposed in the containing opening. The electronic module ejecting mechanism includes a frame, a door, a rod, a sliding sheet, a button, and a swing sheet. The frame has an extraction opening. The electronic module is detachably inserted into the frame via the extraction opening. The door has a transverse slot formed thereon. The door is openably pivoted to a front side of the frame for covering the extraction opening. The rod is slidably disposed in the frame. The rod has a groove end and a bending end. A back side of the electronic module abuts against the bending end when the electronic module is inserted into the frame. The sliding sheet is slidably disposed on a back side of the door facing the extraction opening. The button is slidably disposed on a front side of the door and connected to the sliding sheet through the transverse slot, for driving the sliding sheet to slide between a release position and a lock position along the transverse slot on the door. The swing sheet has a pivot end and a latch end. The pivot end is pivoted to the sliding sheet to make the swing sheet swingable between an attaching position and an expanding position relative to the sliding sheet. The latch end is separate from the groove end when the sliding sheet slides to the release position. The latch end is inserted into the groove end when the sliding sheet slides to the lock position. When the button drives the sliding sheet to slide to the lock position and the swing sheet swings to the expanding position with outward opening of the door relative to the frame, the latch end pulls the groove end to make the rod slide forward, so as to push the electronic module via the bending end to protrude from the extraction opening partially. When the door continues opening outwardly relative to the frame, the latch end is separate from the groove end with outward opening of the door.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
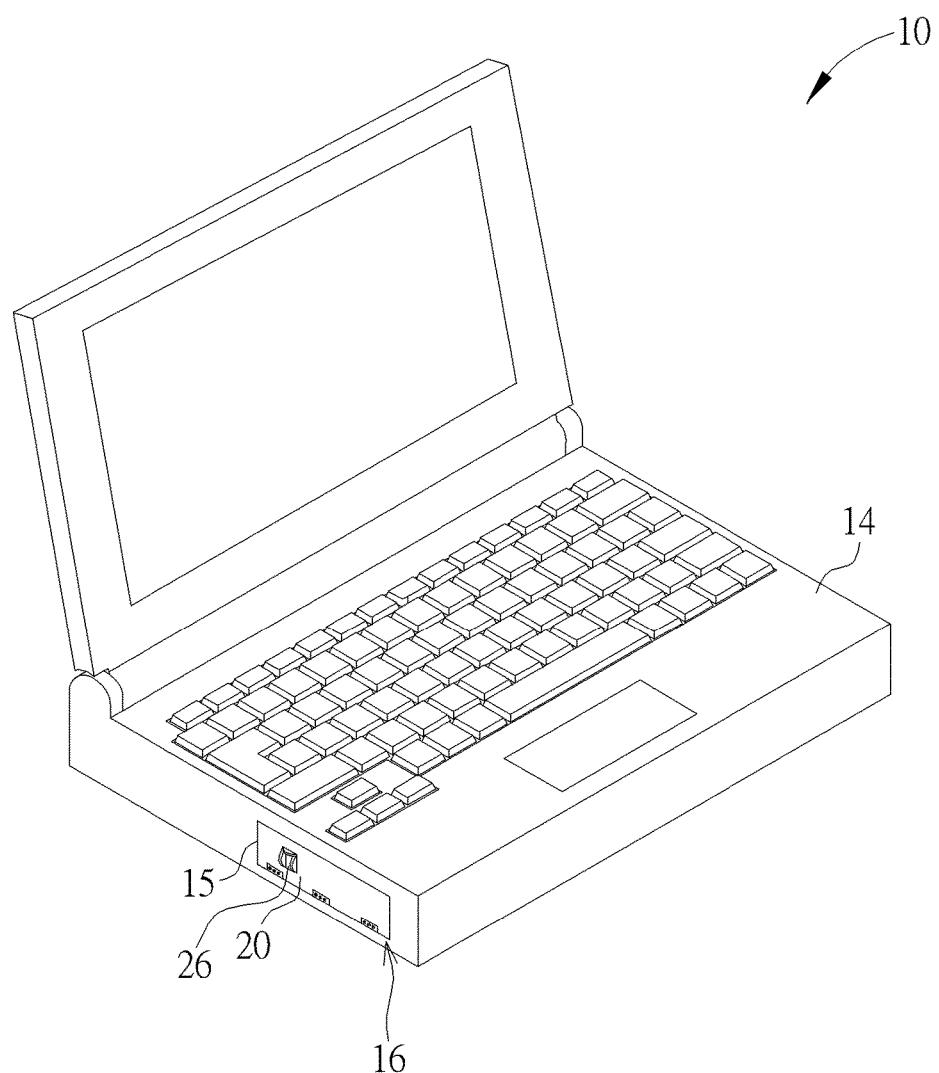
FIG. 1 is a schematic diagram of a portable electronic device according to an embodiment of the present invention.

Please refer to FIG. 1, which is a diagram of a portable electronic device 10 according to an embodiment of the present invention. In this embodiment, the portable electronic device 10 could preferably be a notebook (e.g. notebook for military use with a waterproof function), but not limited thereto. As shown in FIG. 1, the portable electronic device 10 includes an electronic module 12, a device body 14, and an electronic module ejecting mechanism 16. The electronic module 12 could preferably be an optical disk drive, but not limited thereto, meaning that the electronic module 12 could be an electronic apparatus commonly applied to a conventional electronic device for data access and update in another embodiment, such as a hard disk drive. The device body 14 could include major components in the portable electronic device 10, such as a display monitor, a keyboard, and a computer host, for performing data transmission between the electronic module 12 and the device body 14. The device body 14 has a containing opening 15 for containing the electronic module 12.

Figure 2:
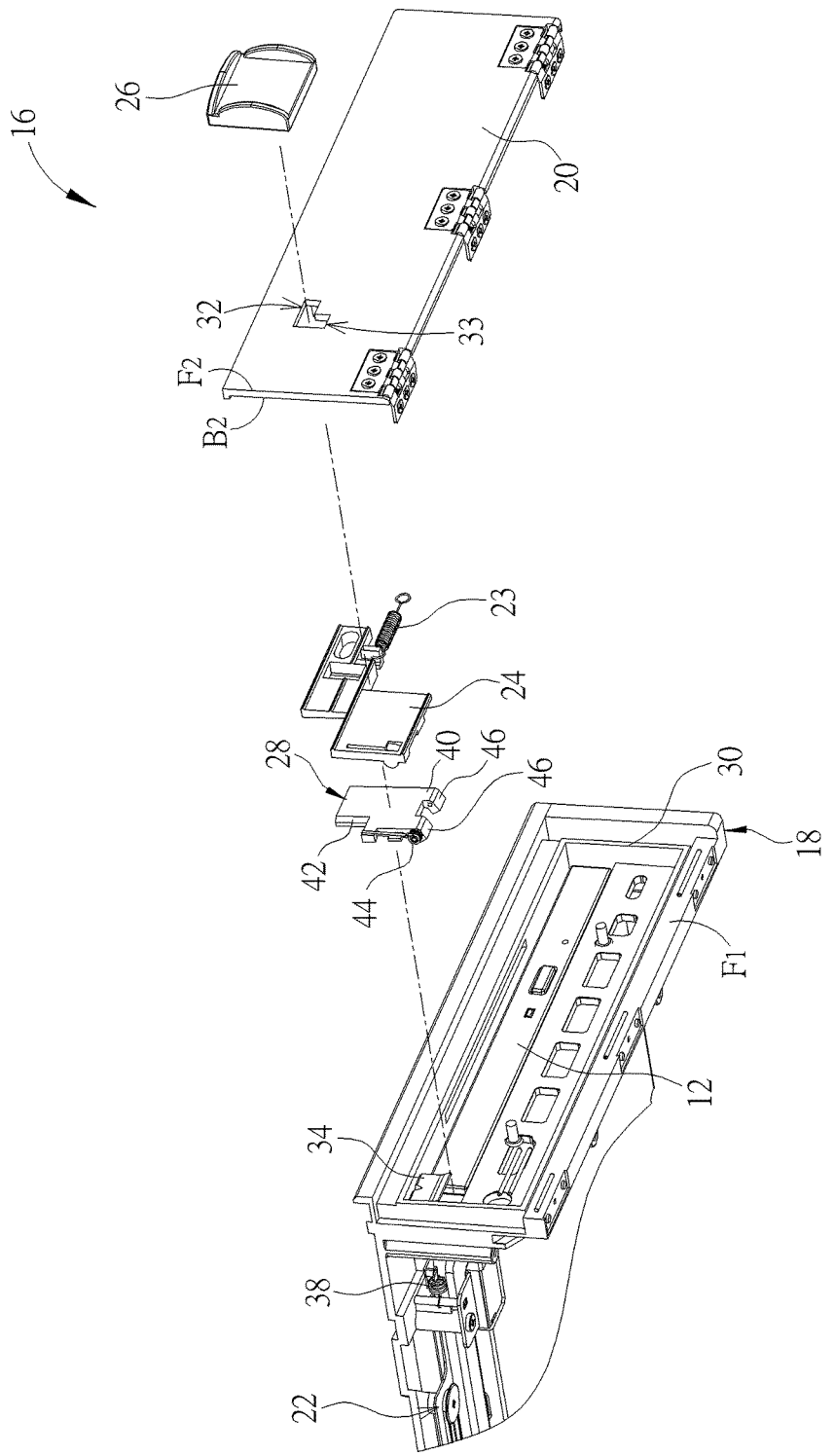
FIG. 2 is a partial exploded diagram of an electronic module and an electronic module ejecting mechanism in FIG. 1.
Figure 3:
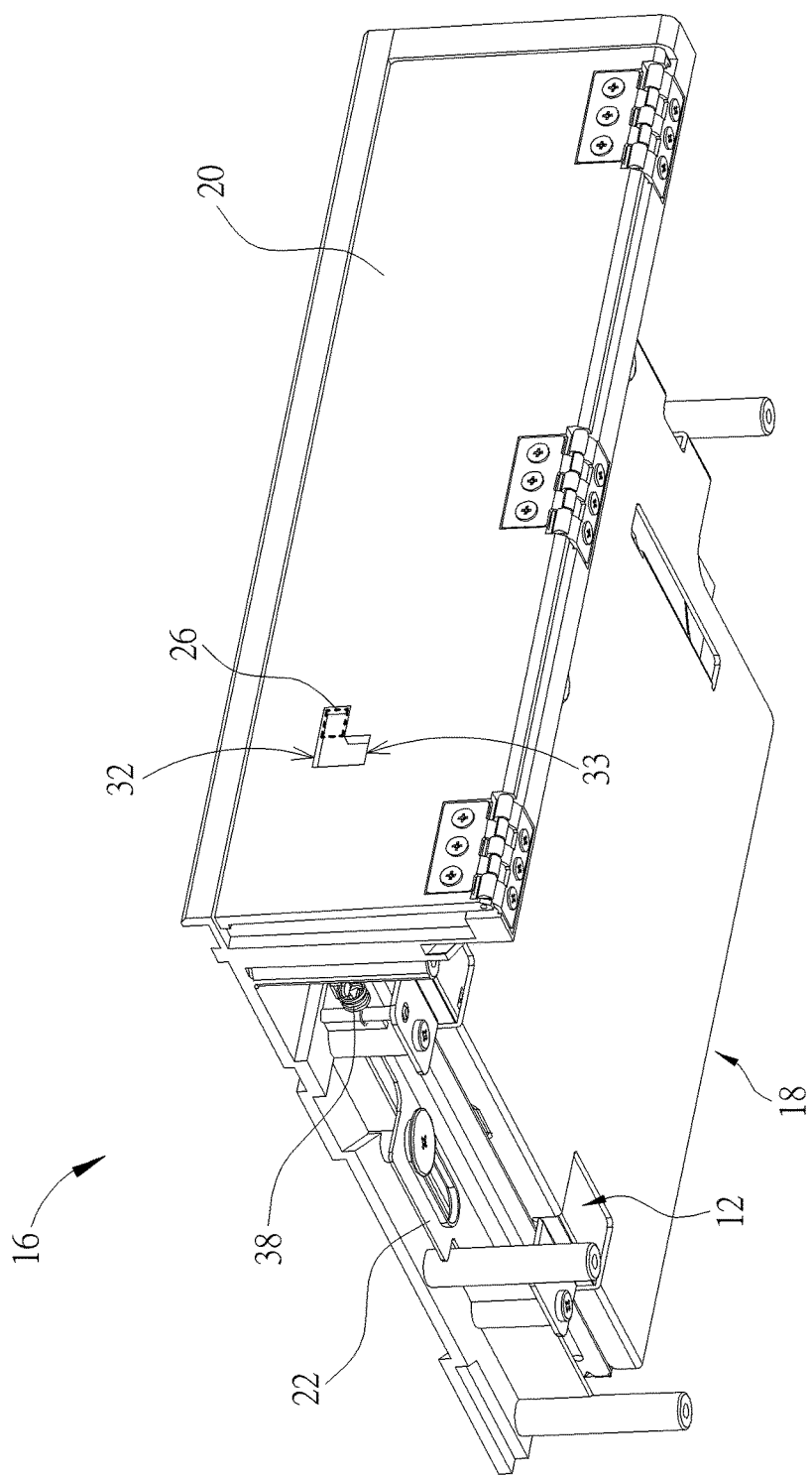
FIG. 3 is an assembly diagram of the electronic module and the electronic module ejecting mechanism in FIG. 2.
Figure 4:
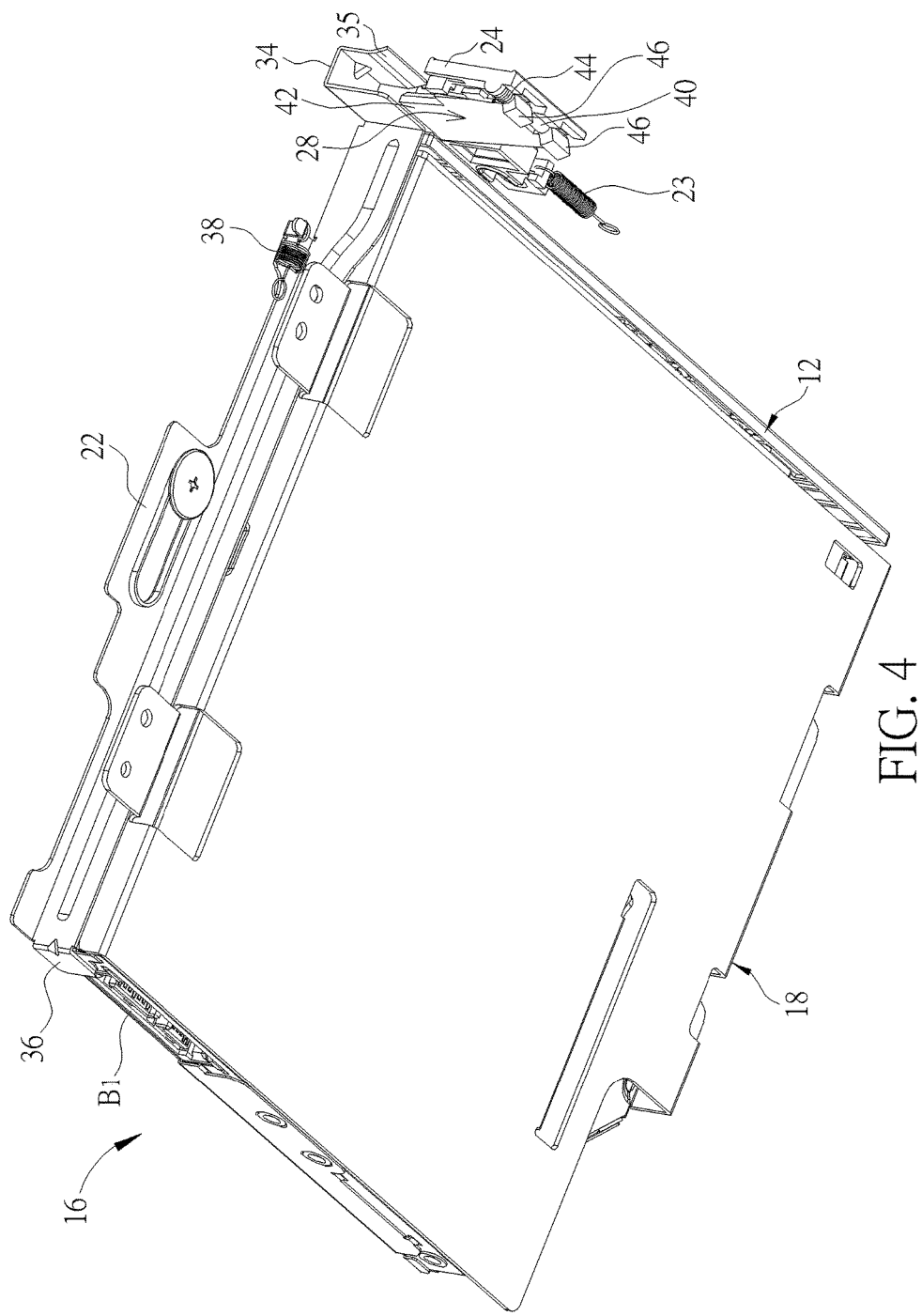
FIG. 4 is a schematic diagram of the electronic module and the electronic module ejecting mechanism in FIG. 3 from another viewing angle.
Figure 5:
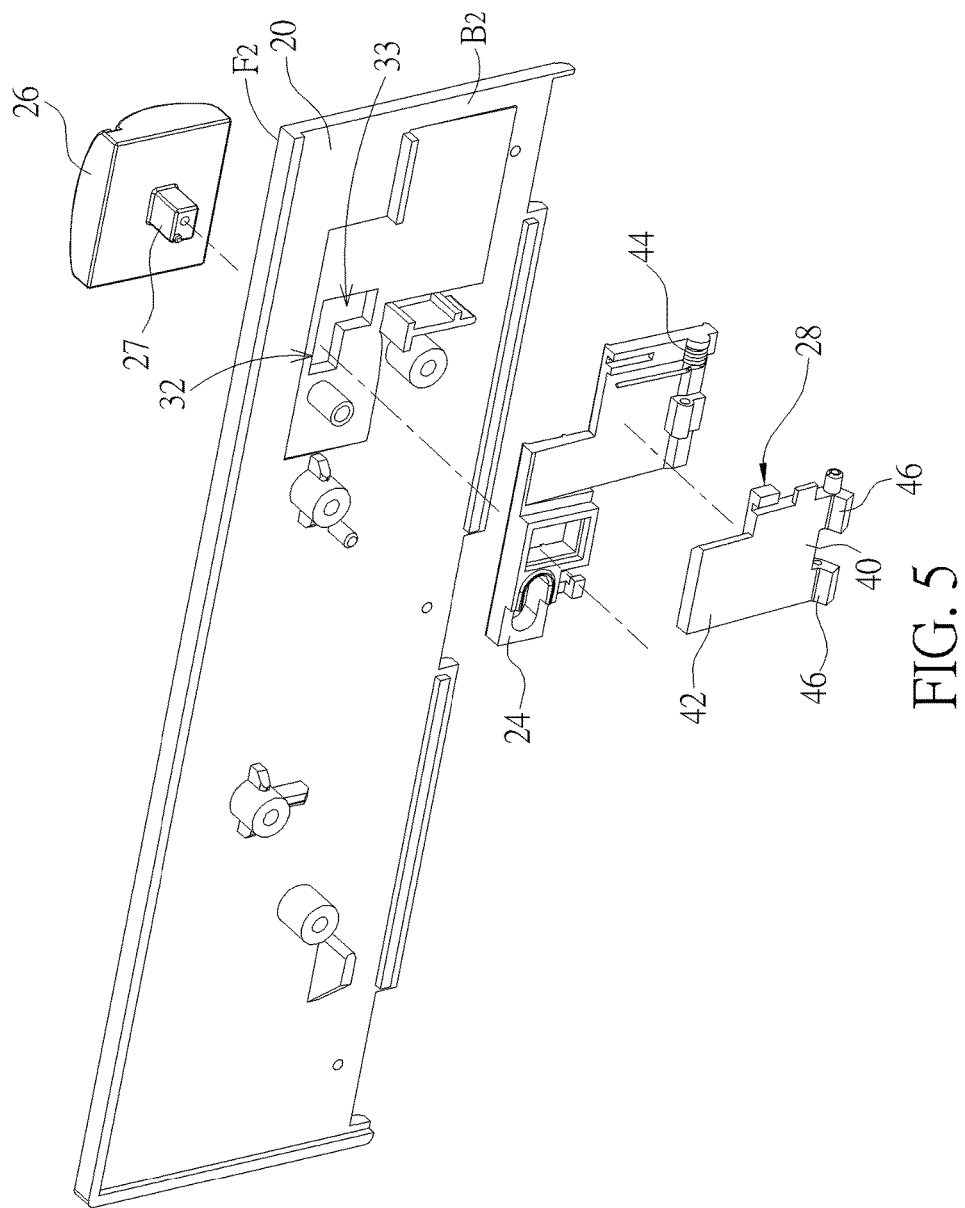
FIG. 5 is a partial exploded diagram of a door, a sliding sheet, a button, a swing sheet, and a torsion spring in FIG. 2 from another viewing angle.
Figure 6:
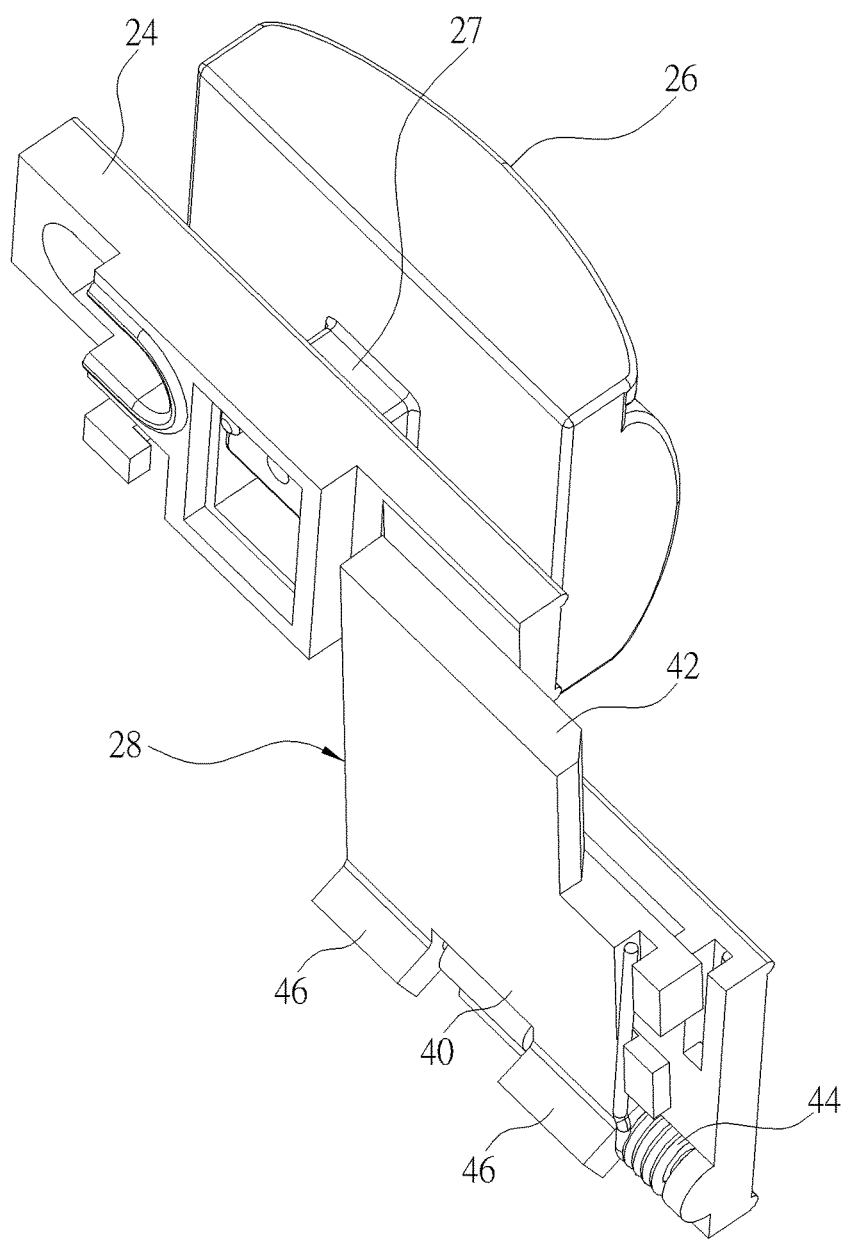
FIG. 6 is an assembly diagram of the door, the sliding sheet, the button, the swing sheet, and the torsion spring in FIG. 5.

More detailed description for the mechanical design of the electronic module ejecting mechanism 16 is provided as follows. Please refer to FIG. 1, FIG. 2, FIG. 3, FIG. 4, FIG. 5, and FIG. 6. FIG. 2 is a partial exploded diagram of the electronic module 12 and the electronic module ejecting mechanism 16 in FIG. 1. FIG. 3 is an assembly diagram of the electronic module 12 and the electronic module ejecting mechanism 16 in FIG. 2. FIG. 4 is a diagram of the electronic module 12 and the electronic module ejecting mechanism 16 in FIG. 3 from another viewing angle. FIG. 5 is a partial exploded diagram of a door 20, a sliding sheet 24, a button 26, a swing sheet 28, and a torsion spring 44 in FIG. 2. FIG. 6 is an assembly diagram of the door 20, the sliding sheet 24, the button 26, the swing sheet 28, and the torsion spring 44 in FIG. 5. For clearly showing the internal mechanical design of the electronic module ejecting mechanism 16, the door 20 is omitted and a partial frame structure is briefly depicted for a frame 18 in FIG. 4. The button 26 is briefly depicted by a dotted-line square frame in FIG. 3 for clearly showing the position relationship between the button 26 and the door 20.

As shown in FIG. 1, FIG. 2, FIG. 3, and FIG. 4, the electronic module ejecting mechanism 16 is disposed in the containing opening 15 and includes the frame 18, the door 20, a rod 22, the sliding sheet 24, the button 26, and the swing sheet 28. The frame 18 has an extraction opening 30, so that the electronic module 12 could be detachably inserted into the frame 18 via the extraction opening 30. The frame 18 is disposed in the containing opening 15 of the portable electronic device 10 by a conventional fixing method (e.g. the frame 18 could be fixed to the containing opening 15 in a screw locking manner), and the related description is omitted herein since it is commonly seen in the prior art. A transverse slot 32 is formed on the door 20, and the door 20 is openably pivoted to a front side $F_1$ of the frame 18 so that the door 20 could be close relative to the frame 18 for covering the extraction opening 30 and could be open outwardly relative to the frame 18 for a user to perform an extraction or plugging operation of the electronic module 12. In this embodiment, the portable electronic device 10 could preferably adopt the design that the door 20 could be close for covering the extraction opening 30 in a tightly sealing manner to generate the waterproof and dustproof effect, and waterproof and dustproof sealing between the door 20 and the extraction opening 30 could be released by a conventional release method (e.g. pressing a release button, but not limited thereto). As for the related description for the sealing and releasing designs of the door 20, it is commonly seen in the prior art and therefore omitted herein.

Please refer to FIG. 2 and FIG. 4, the rod 22 is slidably disposed in the frame 18 and has a groove end 34 (preferably inverted U-shaped, but not limited thereto) and a bending end 36. When the electronic module 12 is inserted into the frame 18, a back side $B_1$ of the electronic module 12 abuts against the bending end 36 (as shown in FIG. 4). Accordingly, when the rod 22 is pulled out by the swing sheet 28, the electronic module 12 could slide with forward movement of the rod 22 to partially protrude from the extraction opening 30 via abutting of the back side $B_1$ of the electronic module 12 against the bending end 36. Furthermore, in practical application, the electronic module ejecting mechanism 16 could further include a returning spring 38. The returning spring 38 is connected to the rod 22 and the frame 18 for providing an elastic force to drive the rod 22 back to its original position.

Please refer to FIG. 2, FIG. 3, and FIG. 5. The sliding sheet 24 is slidably disposed on a back side $B_2$ of the door 20 facing the extraction opening 30, and the button 26 is slidably disposed on a front side $F_2$ of the door 20 and connected to the sliding sheet 24 through the transverse slot 32 (as shown in FIG. 5, the button 26 could have a protruding pillar 27 passing through the transverse slot 32 to be inserted into the sliding sheet 24, so that the sliding sheet 24 could be assembled with the button 26 and could move together with the button 26). In such a manner, the button 26 could drive the sliding sheet 24 to slide on the door 20 along the transverse slot 32. To be noted, the aforesaid returning design could be applied to the sliding sheet 24. That is to say, in this embodiment, as shown in FIG. 2, the electronic module ejecting mechanism 16 could further include a returning spring 23. The returning spring 23 is connected to the sliding sheet 24 and the door 20 for providing an elastic force to drive the sliding sheet 24 back to its original position. Furthermore, as shown in FIG. 2 and FIG. 3, a longitudinal slot 33 could be formed on the door 20. The longitudinal slot 33 is communicated with the transverse slot 32. Accordingly, when the button 26 enters the longitudinal slot 33 along the transverse slot 32, the longitudinal slot 33 could stop the button 26 from moving back to a release position, so that the button 26 could still stay at a lock position without the user pushing the button 26.

Please refer to FIG. 4 and FIG. 6, the swing sheet 28 has a pivot end 40 and a latch end 42. The pivot end 40 is pivoted to the sliding sheet 24 so that the swing sheet 28 could swing relative to the sliding sheet 24. The latch end 42 could be inserted into the groove end 34 for making the swing sheet 28 capable of pulling out the rod 22. In this embodiment, the electronic module ejecting mechanism 16 could further include the torsion spring 44. The torsion spring 44 is connected to the pivot end 40 and the sliding sheet 24 for providing an elastic force to drive the swing sheet 28 to automatically move back to an attaching position as shown in FIGS. 4 and 6. In practical application, an edge of the groove end 34 corresponding to the latch end 42 could have a lead angle structure 35 formed thereon, so as to make the latch end 42 separate from the groove end 34 smoothly along the lead angle structure 35 with outward opening of the door 20.

Figure 7:
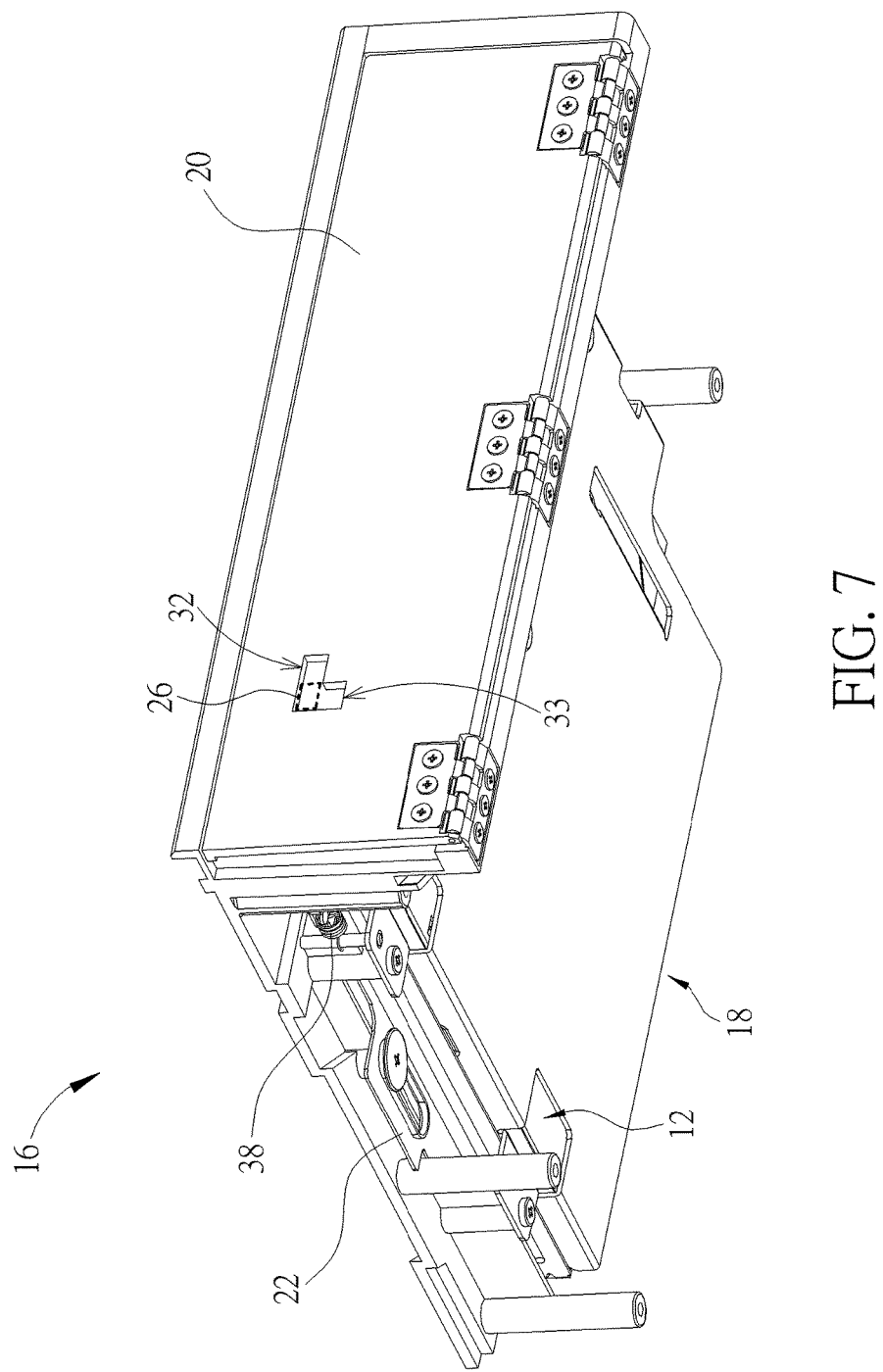
FIG. 7 is a schematic diagram of the button in FIG. 3 moving to a lock position along a transverse slot.
Figure 8:
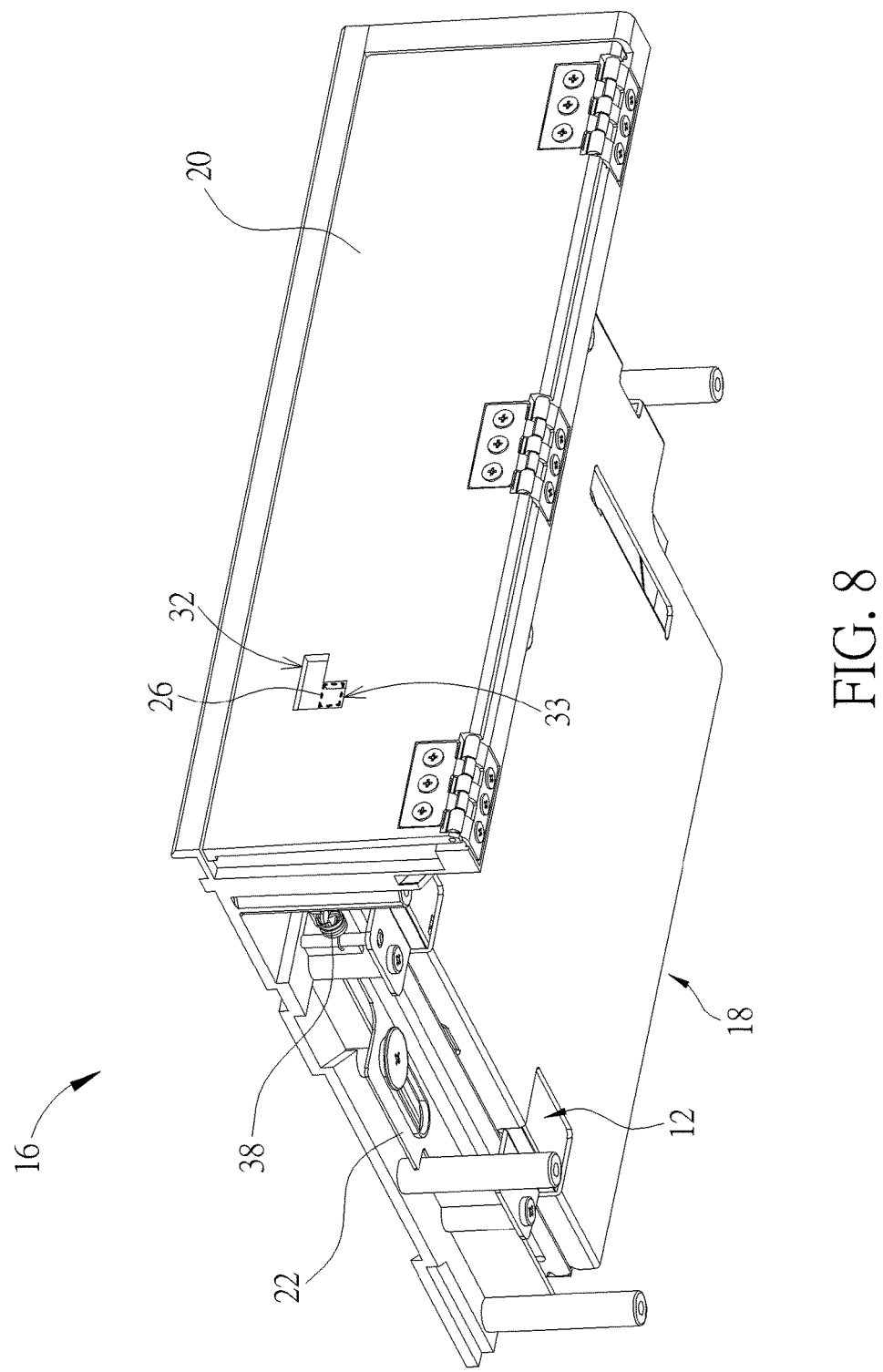
FIG. 8 is a schematic diagram of the button in FIG. 7 entering a longitudinal slot.
Figure 9:
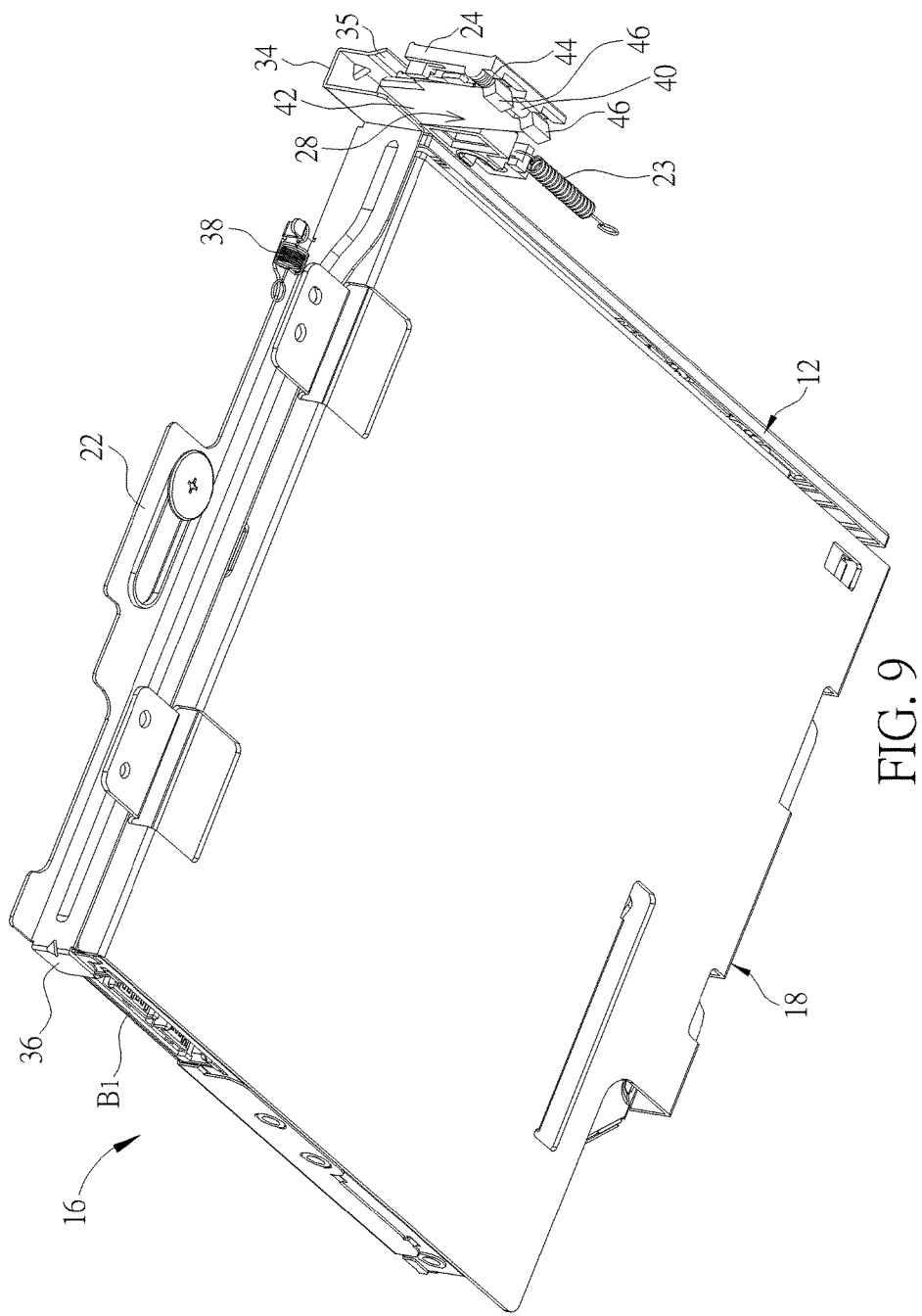
FIG. 9 is a schematic diagram of the electronic module and the electronic module ejecting mechanism in FIG. 8 from another viewing angle.
Figure 10:
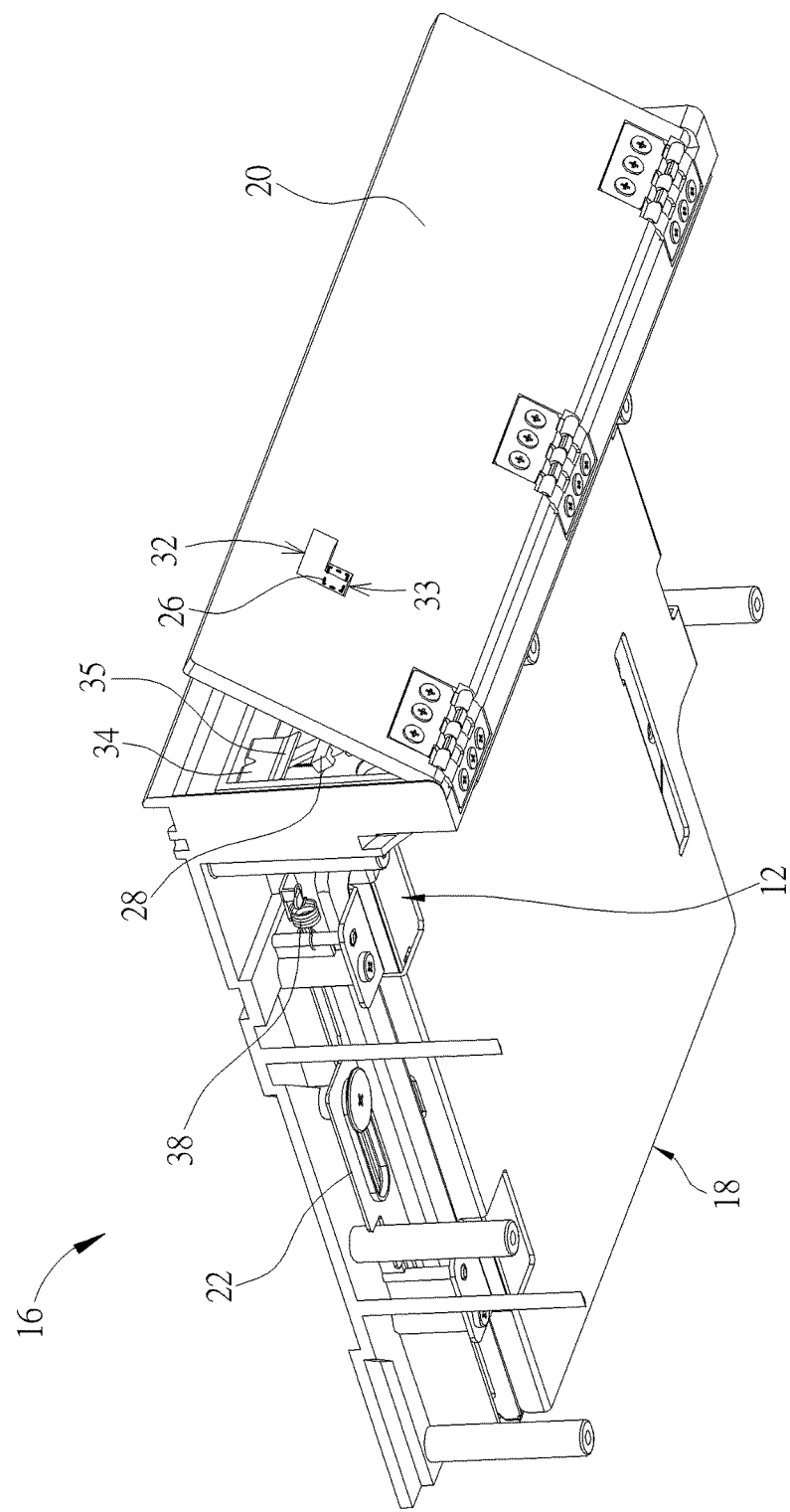
FIG. 10 is a schematic diagram of the door in FIG. 8 opening outwardly relative to a frame.
Figure 11:
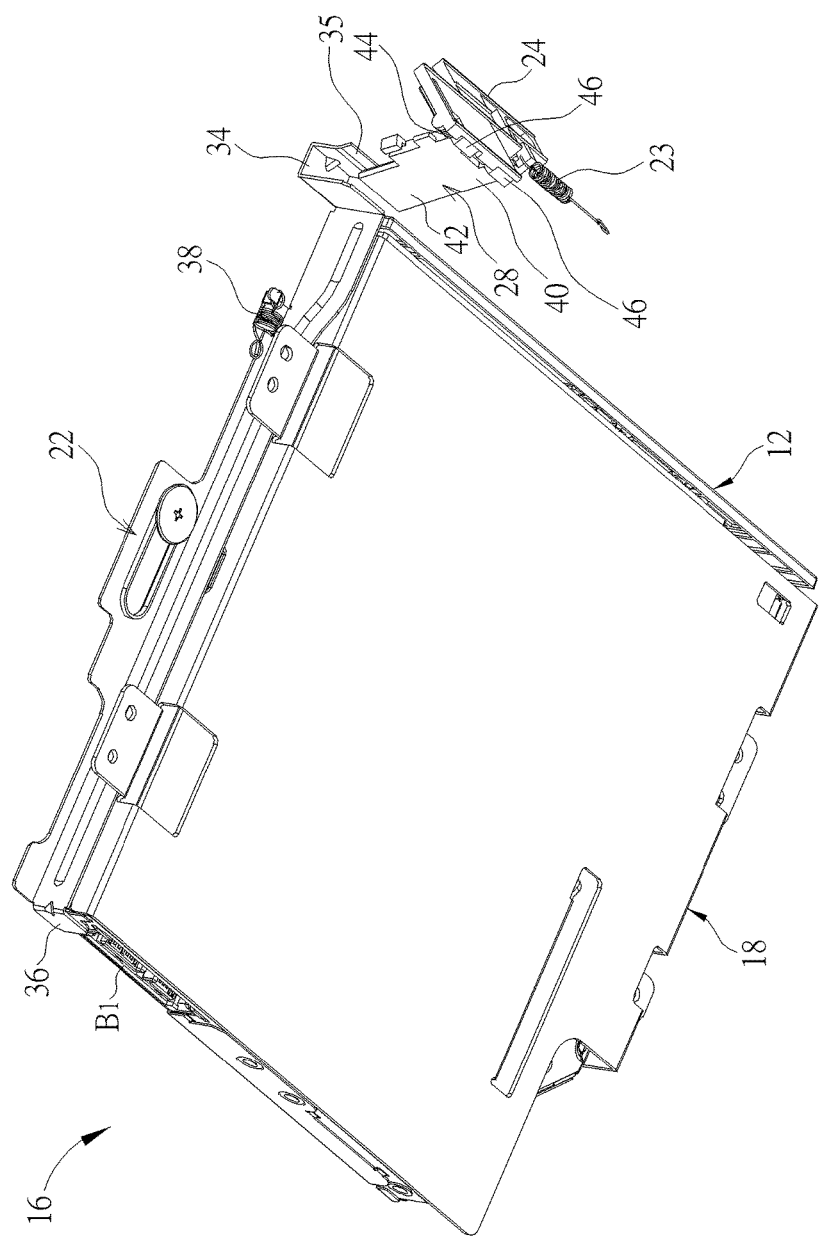
FIG. 11 is a schematic diagram of the electronic module and the electronic module ejecting mechanism in FIG. 10 from another viewing angle.
Figure 12:
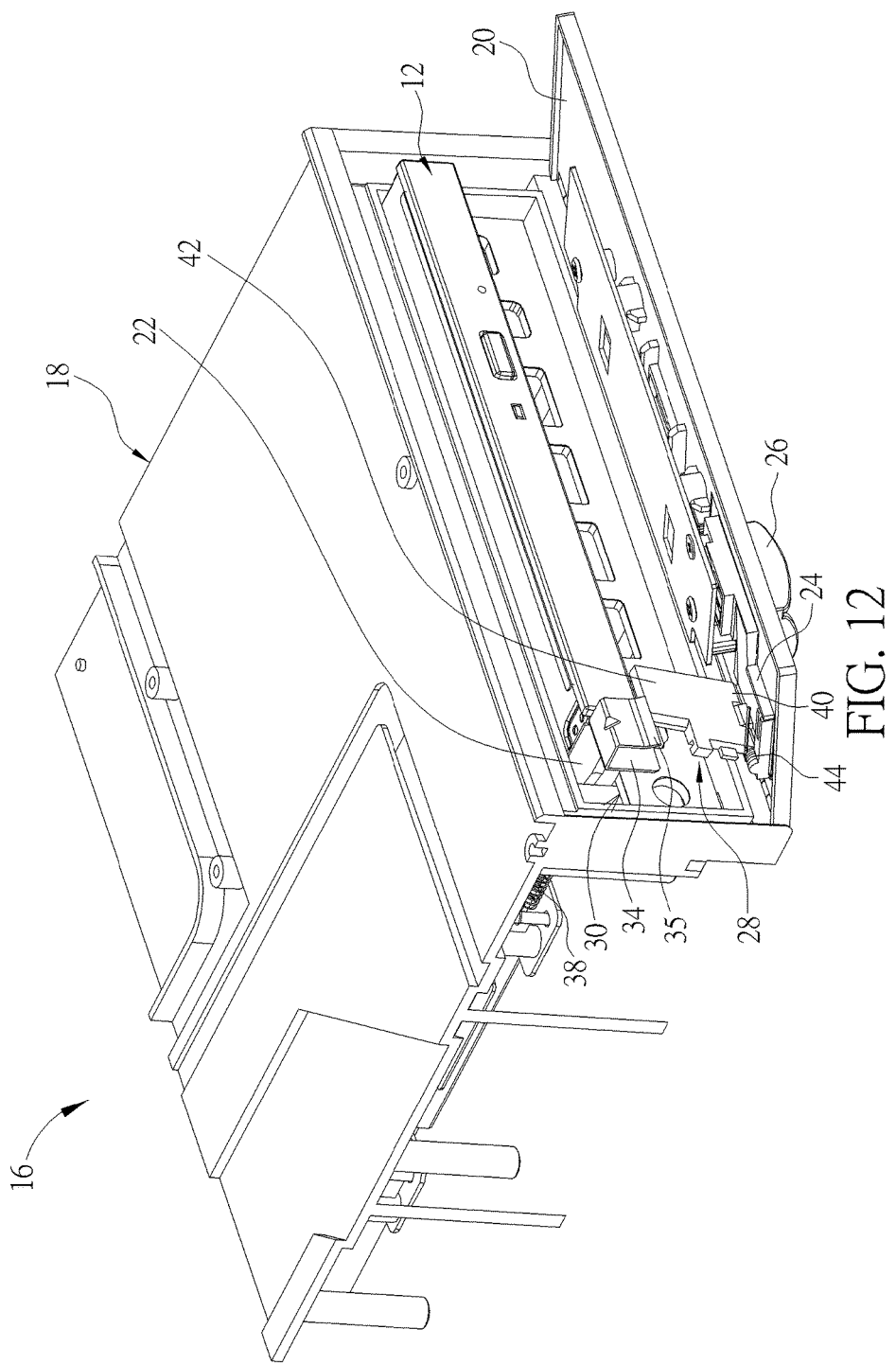
FIG. 12 is a schematic diagram of the door in FIG. 10 continuing opening outwardly relative to the frame.
Figure 13:
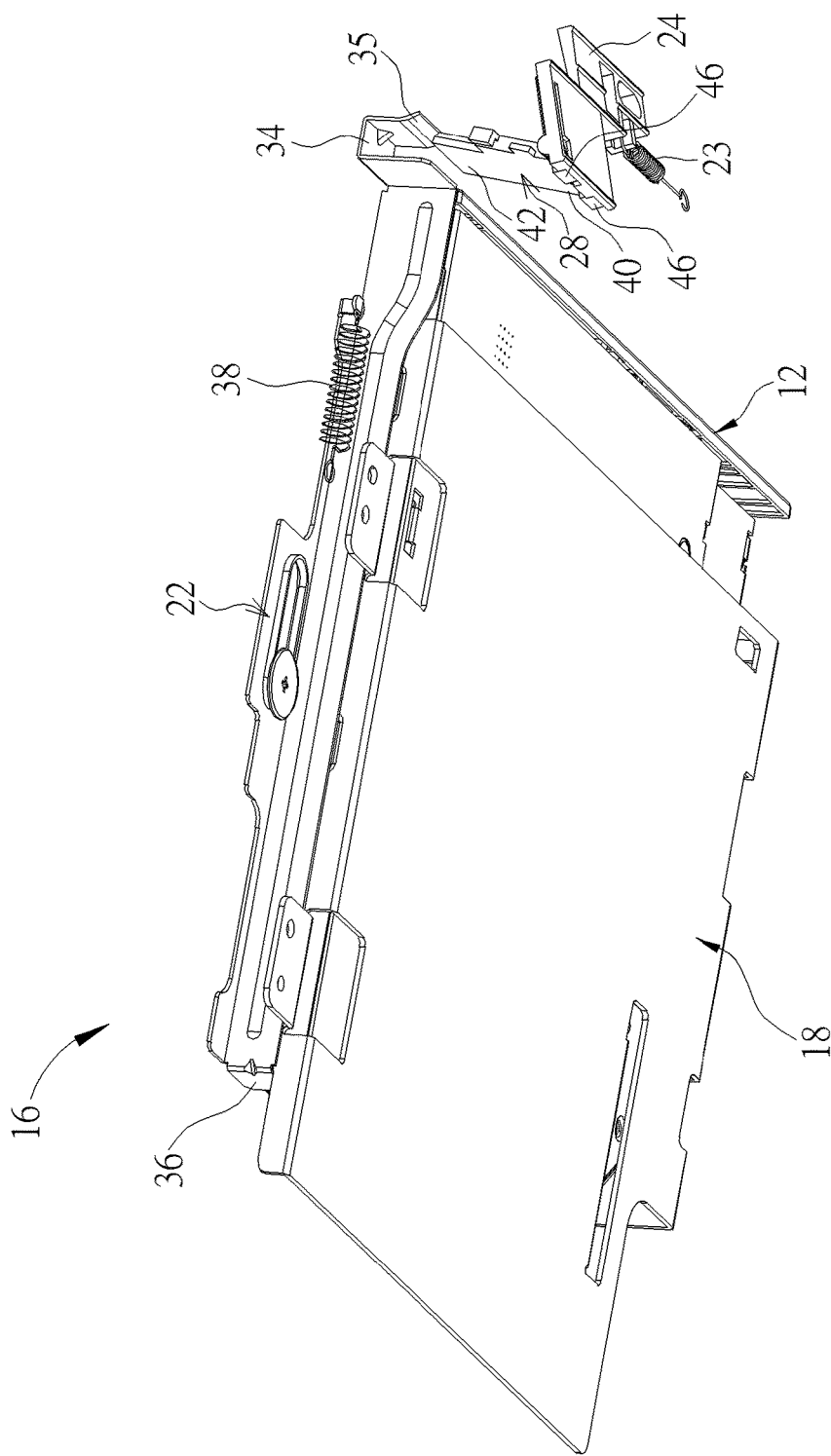
FIG. 13 is a schematic diagram of the electronic module and the electronic module ejecting mechanism in FIG. 12 from another viewing angle.
Figure 14:
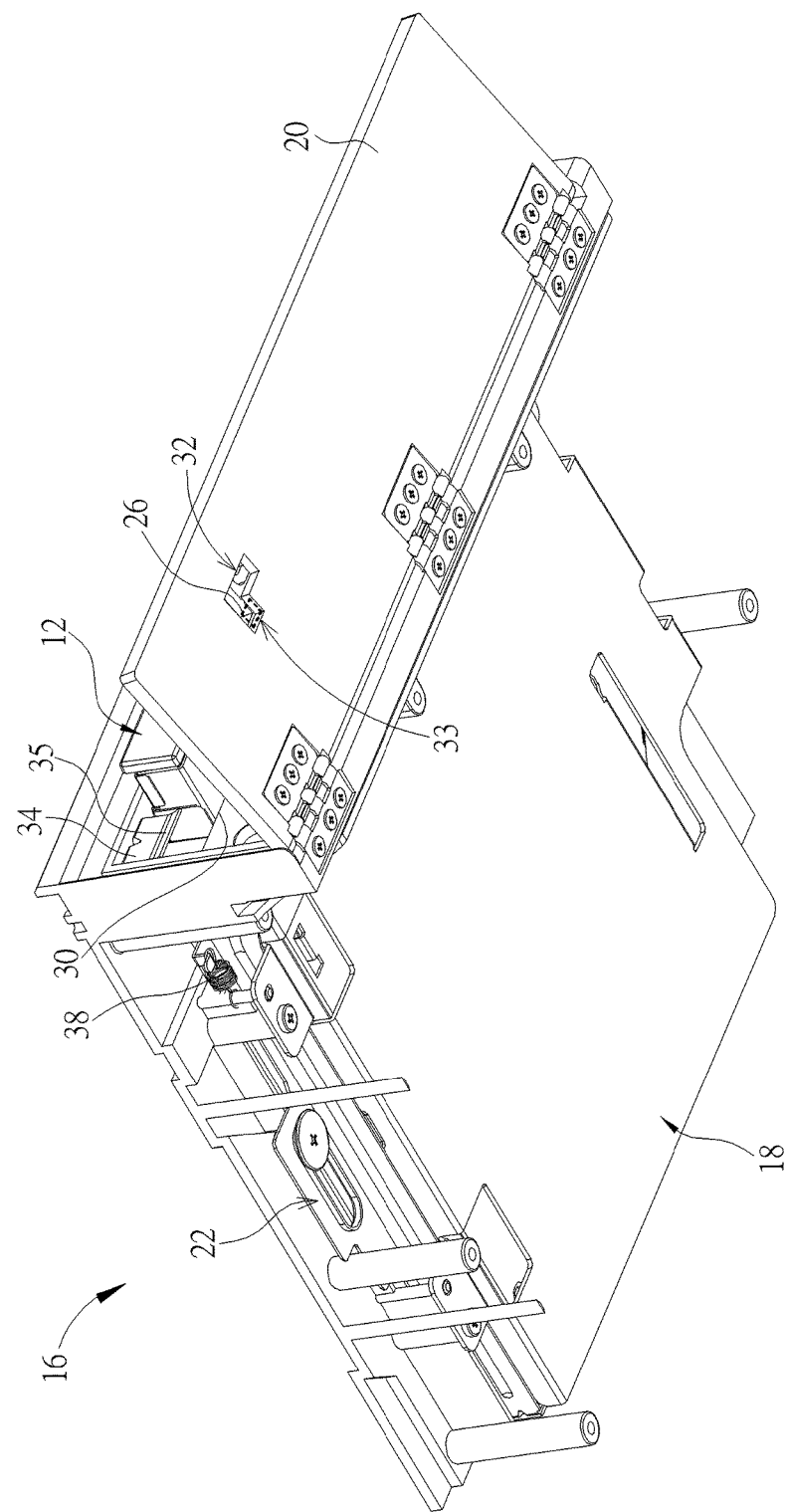
FIG. 14 is a schematic diagram of the door in FIG. 12 continuing opening outwardly relative to the frame 18.
Figure 15:
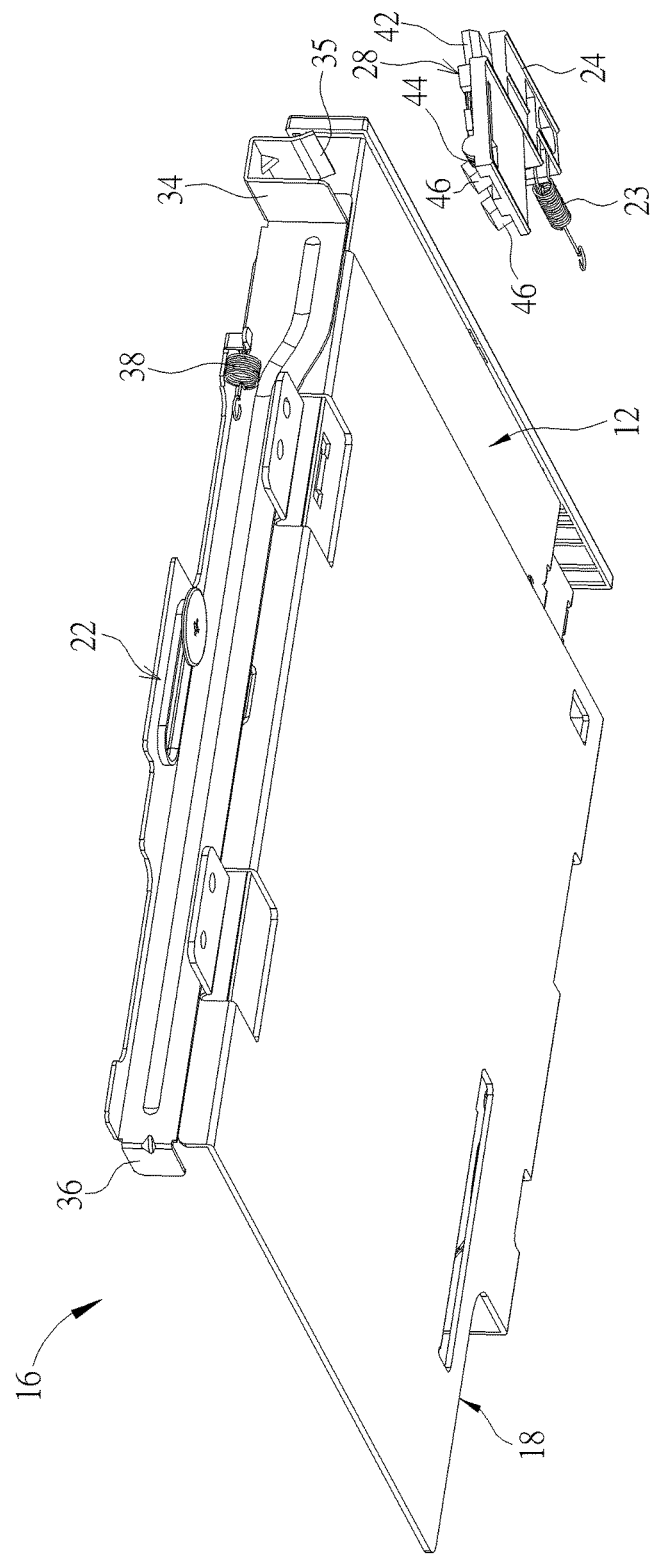
FIG. 15 is a schematic diagram of the electronic module and the electronic module ejecting mechanism in FIG. 14 from another viewing angle.
Figure 16:
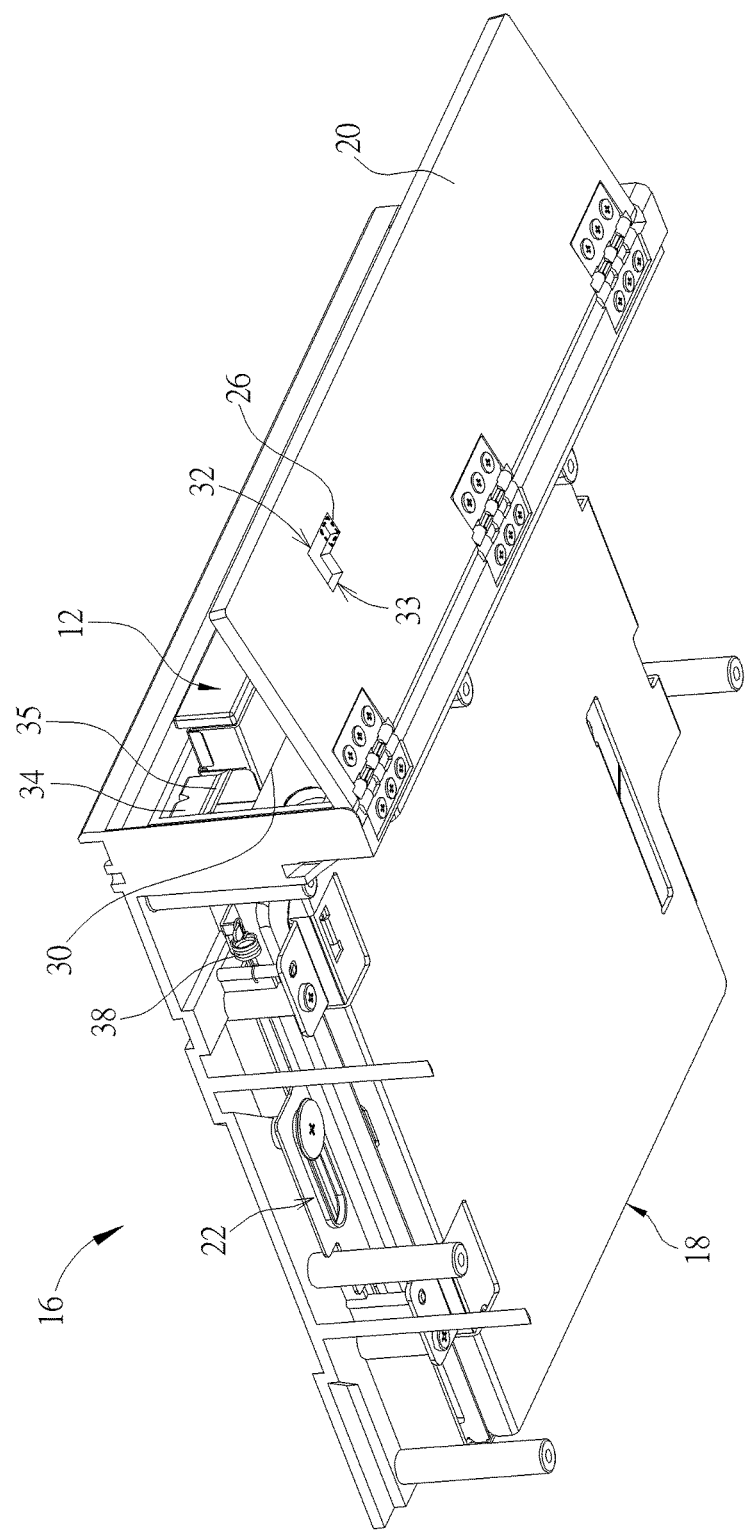
FIG. 16 is a schematic diagram of the button in FIG. 14 moving back to a release position.

More detailed description for the electronic module extraction operation of the electronic module ejecting mechanism 16 is provided as follows. Please refer to FIG. 3, FIG. 4, FIG. 7, FIG. 8, FIG. 9, FIG. 10, FIG. 11, FIG. 12, FIG. 13, FIG. 14, FIG. 15, and FIG. 16. FIG. 7 is a diagram of the button 26 in FIG. 3 moving to the lock position along the transverse slot 32. FIG. 8 is a diagram of the button 26 in FIG. 7 entering the longitudinal slot 33. FIG. 9 is a diagram of the electronic module 12 and the electronic module ejecting mechanism 16 in FIG. 8 from another viewing angle. FIG. 10 is a diagram of the door 20 in FIG. 8 opening outwardly relative to the frame 18. FIG. 11 is a diagram of the electronic module 12 and the electronic module ejecting mechanism 16 in FIG. 10 from another viewing angle. FIG. 12 is a diagram of the door 20 in FIG. 10 continuing opening outwardly relative to the frame 18. FIG. 13 is a diagram of the electronic module 12 and the electronic module ejecting mechanism 16 in FIG. 12 from another viewing angle. FIG. 14 is a diagram of the door 20 in FIG. 12 continuing opening outwardly relative to the frame 18. FIG. 15 is a diagram of the electronic module 12 and the electronic module ejecting mechanism 16 in FIG. 14 from another viewing angle. FIG. 16 is a diagram of the button 26 in FIG. 14 moving back to the release position. For clearly showing the internal mechanical design of the electronic module ejecting mechanism 16, the door 20 is omitted and a partial frame structure is briefly depicted for the frame 18 in FIGS. 9, 11, 13, 15. The button 26 is briefly depicted by a dotted-line square frame in FIGS. 3, 7, 8, 10, 14, 16 for clearly showing the position relationship between the button 26 and the door 20.

Please refer to FIG. 3, FIG. 4, FIG. 7, FIG. 8, and FIG. 9. When the user wants to extract the electronic module 12 from the extraction opening 30 of the frame 18, the user just needs to release the door 20 (e.g. pressing a release button to release sealing between the door 20 and the extraction opening 30) first, and then pushes the button 26 from the release position as shown in FIG. 3 (at this time, as shown in FIG. 4, the latch end 42 of the swing sheet 28 is separate from the groove end 34 of the rod 22) to the lock position as shown in FIG. 7 along the transverse slot 32 and further presses the button 26 downwardly to enter the longitudinal slot 33, so that the button 26 could be positioned at a position as shown in FIG. 8. During the aforesaid process, the latch end 42 of the swing sheet 28 could be inserted into the groove end 34 of the rod 22 with movement of the button 26 (as shown in FIG. 9), so as to make the swing sheet 28 capable of pulling the rod 22 to slide forward via engagement of the latch end 42 and the groove end 34.

Please refer to FIG. 9, FIG. 10, FIG. 11, FIG. 12, and FIG. 13. After completing the aforesaid operations, the user could pull the released door 20 (as shown in FIG. 10) to open outwardly. During the aforesaid process, the swing sheet 28 could swing to an expanding position as shown in FIG. 11 relative to the sliding sheet 24 with opening of the door 20. To be more specific, as shown in FIG. 9 and FIG. 11, for limiting swinging of the swing sheet 28 relative to the sliding sheet 24, the swing sheet 28 could have at least one block 46 (two shown in FIG. 9, but not limited thereto) extending from the pivot end 40. Accordingly, when the swing sheet 28 swings to the expanding position as shown in FIG. 11 to make the block 46 abut against the sliding sheet 24, the block 46 stops the swing sheet 28 from continuously expanding relative to the sliding sheet 24 to make the swing sheet 28 stay at a fixed angle relative to the sliding sheet 24, so as to ensure that the swing sheet 28 could pull the rod 22 to slide forward with outward opening of the door 20. In such a manner, when the user continues pulling the door 20 to open outwardly (as shown in FIG. 12), the door 20 could pull the rod 22 to slide forward relative to the frame 18 to a position as shown in FIG. 13, so that the electronic module 12 could partially protrude from the extraction opening 30 with forward sliding of the rod 22 via abutting of the back side $B_1$ of the electronic module 12 against the bending end 36 of the rod 22.

Please refer to FIG. 12, FIG. 13, FIG. 14, and FIG. 15. When the user continues pulling the door 20 as shown in FIG. 12 outwardly to a position as shown in FIG. 14, the swing sheet 28 could leave the groove end 34 from the position as shown in FIG. 13 along the lead angle structure 35 of the groove end 34. At this time, as mentioned above, since the returning spring 38 is connected to the rod 22 and the frame 18 to drive the rod 22 back to its original position and the torsion spring 44 is connected to the pivot end 40 and the sliding sheet 24 respectively for driving the swing sheet 28 back to its original position, the torsion spring 44 drives the swing sheet 28 back to the attaching position as shown in FIG. 15 and the returning spring 38 drives the rod 22 back to a position as shown in FIG. 15 after the swing sheet 28 is totally separate from the groove end 34.

Please refer to FIG. 4, FIG. 14, FIG. 15, and FIG. 16. Since the electronic module 12 has partially protruded from the extraction opening 30 via linkage between the rod 22 and the swing sheet 28 during the aforesaid process of opening the door 20, the user could extract the electronic module 12 from the extraction opening 30 of the frame 18 smoothly and quickly to complete the electronic module extraction operation of the electronic module ejecting mechanism 16. To be noted, in practical application, for preventing the swing sheet 28 as shown in FIG. 15 from interfering with the groove end 34 to make the user unable to close the door 20, the user could push the button 26 as shown in FIG. 14 upwardly to enter the transverse slot 32. At this time, as mentioned above, since the returning spring 23 is connected to the sliding sheet 24 and the door 20 for driving the sliding sheet 24 back to its original position, the button 26 could move to the release position as shown in FIG. 16 with returning of the sliding sheet 24. In such a manner, the user could close the door 20 smoothly since the swing sheet 28 is misaligned with the groove end 34 of the rod 22 (the related description could be reasoned by analogy according to FIG. 4).

It should be mentioned that the returning spring 23, the returning spring 38, and the torsion spring 44 could be omitted for simplifying the mechanical design of the electronic module ejecting mechanism 16. That is to say, in another embodiment of omitting the returning spring 23, the returning spring 38, and the torsion spring 44, returning of the rod 22, the sliding sheet 24 and the swing sheet 28 could be performed manually by the user. Furthermore, the design of limiting swinging of the swing sheet 28 relative to the sliding sheet 24 is not limited to the aforesaid embodiment, meaning that the present invention could adopt other limiting design (e.g. the swing sheet could be pivoted to the sliding sheet via a torsion shaft so that the swing sheet could be positioned at the expanding position by a torsion torque provided by the torsion shaft) and the related description is omitted herein since it is commonly seen in the prior art.

In summary, the present invention adopts the linkage design that the button drives the sliding sheet to slide on the door to make the latch end of the swing sheet inserted into the groove end of the rod, so that the swing sheet could pull the rod to slide forward with outward opening of the door for driving the electronic module to protrude from the extraction opening of the frame partially. Compared with the prior art adopting the two-stage ejecting design, the electronic module ejecting mechanism provided by the present invention could allow that the user could synchronously pull the electronic module to protrude from the frame partially while opening the door, so that the user could complete the electronic module ejecting operation more quickly and conveniently. Thus, operational convenience of the portable electronic device in extracting the electronic module out of the portable electronic device could be improved greatly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic module ejecting mechanism for ejecting an electronic module, the electronic module ejecting mechanism comprising:
    a frame having an extraction opening, the electronic module being detachably inserted into the frame via the extraction opening;
    a door having a transverse slot formed thereon, the door being openably pivoted to a front side of the frame for covering the extraction opening;
    a rod slidably disposed in the frame, the rod having a groove end and a bending end, a back side of the electronic module abutting against the bending end when the electronic module is inserted into the frame;
    a sliding sheet slidably disposed on a back side of the door facing the extraction opening;
    a button slidably disposed on a front side of the door and connected to the sliding sheet through the transverse slot, for driving the sliding sheet to slide between a release position and a lock position along the transverse slot on the door; and
    a swing sheet having a pivot end and a latch end, the pivot end being pivoted to the sliding sheet to make the swing sheet swingable between an attaching position and an expanding position relative to the sliding sheet, the latch end being separate from the groove end when the sliding sheet slides to the release position, the latch end being inserted into the groove end when the sliding sheet slides to the lock position;
    wherein when the button drives the sliding sheet to slide to the lock position and the swing sheet swings to the expanding position with outward opening of the door relative to the frame, the latch end pulls the groove end to make the rod slide forward, so as to push the electronic module via the bending end to protrude from the extraction opening partially;
    when the door continues opening outwardly relative to the frame, the latch end is separate from the groove end with outward opening of the door.

2. The electronic module ejecting mechanism of claim 1 further comprising:
    a torsion spring connected to the pivot end and the sliding sheet respectively for providing an elastic force to make the swing sheet return to the attaching position.

3. The electronic module ejecting mechanism of claim 1, wherein the swing sheet has at least one block extending from the pivot end, and when the swing sheet swings to the expanding position, the at least one block abuts against the sliding sheet to stop the swing sheet from continuously expanding relative to the sliding sheet.

4. The electronic module ejecting mechanism of claim 1, wherein a lead angle structure is formed at an edge of the groove end corresponding to the latch end.

5. The electronic module ejecting mechanism of claim 1 further comprising:
    a returning spring connected to the rod and the frame for driving the rod to return to its original position.

6. The electronic module ejecting mechanism of claim 1 further comprising:
    a returning spring connected to the sliding sheet and the door for driving the sliding sheet to return to its original position.

7. The electronic module ejecting mechanism of claim 6, wherein the door further has a longitudinal slot formed thereon, the longitudinal slot is communicated with the transverse slot, and the longitudinal slot stops the button from returning to the release position when the button enters the longitudinal slot along the transverse slot.

8. A portable electronic device comprising:
    an electronic module;
    a device body having a containing opening to contain the electronic module for performing data transmission between the device body and the electronic module; and
    an electronic module ejecting mechanism disposed in the containing opening, the electronic module ejecting mechanism comprising:
        a frame having an extraction opening, the electronic module being detachably inserted into the frame via the extraction opening;
        a door having a transverse slot formed thereon, the door being openably pivoted to a front side of the frame for covering the extraction opening;
        a rod slidably disposed in the frame, the rod having a groove end and a bending end, a back side of the electronic module abutting against the bending end when the electronic module is inserted into the frame;
        a sliding sheet slidably disposed on a back side of the door facing the extraction opening;
        a button slidably disposed on a front side of the door and connected to the sliding sheet through the transverse slot, for driving the sliding sheet to slide between a release position and a lock position along the transverse slot on the door; and a swing sheet having a pivot end and a latch end, the pivot end being pivoted to the sliding sheet to make the swing sheet swingable between an attaching position and an expanding position relative to the sliding sheet, the latch end being separate from the groove end when the sliding sheet slides to the release position, the latch end being inserted into the groove end when the sliding sheet slides to the lock position;

wherein when the button drives the sliding sheet to slide to the lock position and the swing sheet swings to the expanding position with outward opening of the door relative to the frame, the latch end pulls the groove end to make the rod slide forward, so as to push the electronic module via the bending end to protrude from the extraction opening partially;

when the door continues opening outwardly relative to the frame, the latch end is separate from the groove end with outward opening of the door.

9. The portable electronic device of claim 8, wherein the electronic module ejecting mechanism further comprises:
a torsion spring connected to the pivot end and the sliding sheet respectively for providing an elastic force to make the swing sheet return to the attaching position.

10. The portable electronic device of claim 8, wherein the swing sheet has at least one block extending from the pivot end, and when the swing sheet swings to the expanding position, the at least one block abuts against the sliding sheet to stop the swing sheet from continuously expanding relative to the sliding sheet.

11. The portable electronic device of claim 8, wherein a lead angle structure is formed at an edge of the groove end corresponding to the latch end.

12. The portable electronic device of claim 8, wherein the electronic module ejecting mechanism further comprises:
a returning spring connected to the rod and the frame for driving the rod to return to its original position.

13. The portable electronic device of claim 8, wherein the electronic module ejecting mechanism further comprises:
a returning spring connected to the sliding sheet and the door for driving the sliding sheet to return to its original position.

14. The portable electronic device of claim 13, wherein the door further has a longitudinal slot formed thereon, the longitudinal slot is communicated with the transverse slot, and the longitudinal slot stops the button from returning to the release position when the button enters the longitudinal slot along the transverse slot.

15. The portable electronic device of claim 8, wherein the electronic module is an optical disk drive.

\* \* \* \* \*